United States Patent [19]
Cheng et al.

[11] Patent Number: 5,872,248
[45] Date of Patent: Feb. 16, 1999

[54] METHODS FOR INSERTING SILICON INTO PHTHALOCYANINES AND NAPHTHALOCYANINES

[75] Inventors: Gongzhen Cheng, Wuhan, China; Guolun Hao; Hongqiao Wu, both of Cleveland, Ohio; Ying-Syi Li, Bedford Hts.; Malcolm E. Kenney, Cleveland Hts., both of Ohio

[73] Assignee: Case Western Reserve University, Cleveland, Ohio

[21] Appl. No.: 829,527

[22] Filed: Mar. 28, 1997

[51] Int. Cl.⁶ ............................ C09B 47/04; C09B 47/08
[52] U.S. Cl. ........................................ 540/128; 540/122
[58] Field of Search ........................ 540/128, 122

[56] References Cited

U.S. PATENT DOCUMENTS

| | | | |
|---|---|---|---|
| 4,927,735 | 5/1990 | Era et al. | 540/128 |
| 5,166,197 | 11/1992 | Kenney et al. | 514/63 |
| 5,358,940 | 10/1994 | Capraro et al. | 514/63 |
| 5,484,778 | 1/1996 | Kenney et al. | 514/63 |

FOREIGN PATENT DOCUMENTS

| | | |
|---|---|---|
| 0391284 | 10/1990 | European Pat. Off. . |
| 0558449 | 9/1993 | European Pat. Off. . |

OTHER PUBLICATIONS

"New Phthalocyanine Photosensitizers for Photodynamic Therapy," by Oleinick et al., *Photochemistry and Photobiology*, vol. 57, No. 2, pp. 242–247, Feb. 1993.

"DNA Lesions and DNA Degradation in Mouse Lymphoma L5178Y Cells After Photodyamic Treatment Sensitized by Chloraluminum Phthalocyanine," by Ramakrishnan et al., *Photochemistry and Photobiology*, vol. 50, No. 3, pp. 373–378, Sep. 1989.

"Photodynamic Therapy Induces Rapid Cell Death by Apoptosis in L5178Y Mouse Lymphoma Cells," by Agarwal et al., *Cancer Research*, vol. 51, No. 51, pp. 5993–5996, Nov. 1, 1991.

"The Phthalocyanines: A New Class of Mammalian Cell Photosensitizers With a Potential for Cancer Phototherapy," by Ben–Hur et al., *Int. J. Radiat. Biol.*, vol. 47, No. 2, pp. 145–147, Feb. 1985.

"Activity of Phthalocyanine Photosensitizers Against Human Glioblastoma in Vitro," by Abernathy et al., *Neurosurgery*, 21, No. 4, pp. 468–473, Oct. 1987.

"The Role of Singlet Oxygen in the Photohemolysis of Red Blood Cells Sensitized by Phthalocyanine Sulfonates," by Sonoda et al., *Photochem. Photobiol.*, vol. 46, No. 5, pp. 625–631, Nov. 1987.

"Evaluation of Sulfonated Aluminum Phthalocyanines for Use in Photochemotherapy," by Berg et al., *Cancer Letters*, vol. 44, pp. 7–15, 1989.

"The Effect of Substitutents on Phthalocyanine Phototoxicity," by Rosenthal et al., *Photochem. Photobiol.*, vol. 46, No. 6, pp. 959–963, Dec. 1987.

"Synthesis and Photocytotoxicity of Some New Substituted Phthalocyanines," by Leznoff et al., *Photochem. Photobiol.*, vol. 49, pp. 279–284, Mar. 1989.

*The Merck Manual*, 15th Edition, Robert Berkow, ed., pp. 1219–1220, 1227., 1987.

"The Nuclear Magnetic Resonance Spectra and the Electronic Spectra of Some Silicon and *Germanium Phthalocyanines*," Kane et al., *Inorganic Chemistry*, vol. 9, pp. 1445–1448., 1970.

"Photodynamic Therapy With Phthalocyanine Photosensitisation: Quantitative Studies in a Transplantable Rat Fibrosarcoma," by Tralau et al., *Br. J. Cancer*, vol. 55, No. 4, pp. 389–395, Apr. 1987.

"Biological Activities of Phthalocyanines—IX. Photosensitization of V–79 Chinese Hamster Cells and EMT–6 Mouse MAmmary Tumor by Selectively Sulfonated Zine Phthalocyanines," by Brasseur et al., *Photochem. Photobiol.*, vol. 47, No. 5, pp. 705–711, May 1988.

"Tissue Uptake, Distribution and Potency of the Photoactivable Dye Chloraluminum Sulfonated Phthalocyanine in Mice Bearing Transplantable Tumors," by Chan et al., *Cancer Res.*, vol. 48, No. 11, pp. 3040–3044, Jun. 1, 1988.

"Photodynamic Therapy for Experimental Intraocular Melanoma Using Chloroaluminum Sulfonated Phthalocyanine," *Arch. Ophthalmol.*, vol. 107, pp. 886–890, Jun. 1989.

"Synthesis of Positively Charged Phthalocyanines and Their Activity in the Photodynamic Therapy of Cancer Cells," by Wohrle et al., *Photochem. Photobiol.*, vol. 51, No. 3, pp. 351–356, Mar. 1990.

"Laser–Induced Photodynamic Therapy With Aluminum Phthalocyanine Tetrasulfonate as the Photosensitizer: Differential Phototoxicity in Normal and Malignant Human Cells in Vitro," by Glassberg et al., *J. Inv. Dermatol.*, vol. 94, No. 5, pp. 604–610, May 1990.

"Photodynamic Therapy of Spontaneous Cancers in Felines, Canines, and Snakes With Chloro–Aluminum Sulfonated Phthalocyanine," by Roberts et al., *J. Natl. Cancer Inst.*, vol. 83, No. 1, pp. 1823, Jan. 2, 1991.

"Inactivation of Viruses in Red Cell and Platelet Concentrates With Aluminum Phthalocyanine (AlPc) Sulfonates," by Horowitz et al., *Blood Cells*, vol. 18, No. 1, pp. 141–150, Jan. 1992.

(List continued on next page.)

*Primary Examiner*—Richard L. Raymond
*Assistant Examiner*—Pavanaram K. Sripada
*Attorney, Agent, or Firm*—Calfee, Halter & Griswold LLP

[57] ABSTRACT

A simple, flexible, convenient method for making silicon phthalocyanines and naphthalocyanines by inserting silicon into metal-free phthalocyanines and metal-free naphthalocyanines is provided. The method comprises: providing a metal-free phthalocyanine or metal-free naphthalocyanine; reacting the metal-free phthalocyanine or metal-free naphthalocyanine with $HSiCl_3$ to provide a reaction product; then reacting the reaction product with water; and extracting a silicon phthalocyanine or a silicon naphthalocyanine. The invention also relates to novel phthalocyanines and naphthalocyanines. The phthalocyanines and naphthalocyanines are useful as photosensitizers and as dyes.

27 Claims, No Drawings

OTHER PUBLICATIONS

"Photodynamic Therapy of Chemically–and Ultraviolet B Radiation–Induced Murine Skin Papillomas by Chloroaluminum Phthalocyanine Tetrasulfonate," by Agarwal et al., *Photochem. Photobiol.*, vol. 56, No. 1, pp. 43–50, Jul. 1992.

"Biological Activities of Phthalocyanines—XVI. Tetrahydroxy–and Tetraalkylhydroxy Zinc Phthalocyanines. Effect of Alkyl Chain Length on In Vitro and In Vivo Photodynamic Activities," by Boyle et al., *Br. J. Cancer*, vol. 67, No. 6, pp. 1177–1181, Jun. 1993.

"Phthalocyanines in Photobiology," by I. Rosenthal and E. Ben–Hur, in *Phthalocyanines: Properties and Applications*, ed. by C.C. Leznoff and A.B.P. Lever, VCH Publishers, Inc., New York, pp. 397–425, 1989.

"Preclinical Examination of First and Second Generation Photosensitizers Used in Photodynamic Therapy," by C.J. Gomer, *Photochem. Photobiol.*, vol. 54, No. 6, pp. 1093–1107, Dec. 1991.

"Photodynamic Therapy in Oncology: Mechanisms and Clinical Use," H.I. Pass, *J. Natl. Can. Inst.*, vol. 85, No. 6, pp. 443–456, Mar. 17, 1993.

"Phthalocyanines as Photodynamic Sensitizers," by I. Rosenthal, *Photochem. Photobiol.*, vol. 53, No. 6, pp. 859–870, Jun. 1991.

"Photodynamic effects of silicon phthalocyanines in model cells and tumors" by Oleinick, et al., SPIE vol. 1645, *Optical Methods for Tumor Treatment and Detection*, 1992, pp. 242–250.

Abstract 108:178915p "$\pi$—$\pi$ Interaction, architecture, and bandwidths in molecular metals" by Doris, et al., *Is. J. Chem.*, 1986.

Abstract 102:789444e "The $\pi$—$\pi$ Interactions and bandwidths in molecular metals", Ciliberto, et al., *J. Am. Chem. Soc.* 1984.

"Photodynamic Therapy ofOcular Melanoma with Bis Silicon 2, 3–Naphthalocyanine in a Rabbit Model " by Hill, et al., *Investigative Ophthalmology & Visual Science*, Nov. 1995, vol. 36, No. 12 pp. 2476–2481.

"Photophysical Properties of a Pair of Isomeric Dibenzophthalocyanines" by Aoudia, Mohamed, *The Spectrum*, 9(1), 7, 1996.

"The Synthesis of a Series of Octabutoxy–and Oxtabutoxybenzophthalocyanines and Photophysical Properties of Two Members of the Series", by Aoudia, et al., Center for Photochemical Sciences, Bowling Green State University, Bowling Green, Ohio (published 1996).

"Photophysical Properties of a Pair of Isomeric Dibenzophthalocyanines" by Aoudia, Mohamed, 1995 Annual Report of Bowling Green State University, pp. 28–29.

"Silicon Phthalocyanine/Methyl Methacrylate Copolymer Slab Directional Couplers for All–Optical Switching" by Sounik, et al., *Journal of Applied Polymer Science*, vol. 53, pp. 677–685, (1994).

"Synthesis of Ampjiphilic Phthalocyanines and Langmuir–Blodgett Film Balance Studies of These Compounds" by Batzel, submitted in partial fulfillment of requirements for degree of Doctor of Philosphy Dept. of Chemistry, Case Western Reserve University, Mar. 26, 1990. (Entered in OCLC/Cataloged 21265660).

"The Synthesis, Photophysical and Photobiological Properties, and In Vitro Structure–Activity Relationships of a Set of Silicon Phthalocyanine PDT Photosensitizers" by He, et al., *Photochem. Photobiol.**, vol. 65, No. 3, Mar. 1997, pp. 581–586.

Abstract 126:239641s "Organosilicon (na)phthalocyanine photoactivators and cleaning compositions containing them" by A.D. Wiley, *CA Selects Plus: Organosilicon Chemistry*, Issue 9, 1997, p. 43.

Abstract 126:239642t "Low–hue photodisinfectants", by A.D. Wiley, *CA Selects Plus: Organosilicon Chemistry*, Issue 9, 1997, p. 43.

METHODS FOR INSERTING SILICON INTO PHTHALOCYANINES AND NAPHTHALOCYANINES

BACKGROUND OF THE INVENTION

In the past, silicon phthalocyanines generally have been made by the cyclization of a ring precursor. One such method involves reacting a diiminoisoindoline with a tetrachlorosilane. An example of this route is:

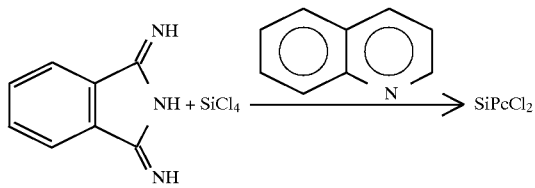

A disadvantage of this method is that it gives byproducts which are difficult to separate. The products are thus difficult to purify. Moreover certain phthalocyanine molecules are difficult, if not impossible, to assemble by this method.

SUMMARY OF THE INVENTION

The present invention provides a simple, flexible, convenient method for making silicon phthalocyanines and naphthalocyanines by inserting silicon into metal-free phthalocyanines and metal-free naphthalocyanines. The method comprises: providing a metal-free phthalocyanine or metal-free naphthalocyanine; reacting the metal-free phthalocyanine or metal-free naphthalocyanine with $HSiCl_3$ to provide a reaction product; then reacting the reaction product with water; and extracting a silicon phthalocyanine or a silicon naphthalocyanine. The invention also relates to novel phthalocyanines and naphthalocyanines.

The phthalocyanines and naphthalocyanines are useful as photosensitizers and as dyes.

DETAILED DESCRIPTION OF THE INVENTION

The present invention provides a simple, flexible, convenient method for making silicon phthalocyanines and silicon naphthalocyanines, hereinafter collectively referred to as "macrocycles", by inserting silicon into metal-free phthalocyanines and metal-free naphthalocyanines. The method is useful for making known compounds as well as novel compounds. The method comprises the following steps: first providing a metal-free phthalocyanine or a metal-free naphthalocyanine preferably having some substituent groups to make it soluble. The metal-free phthalocyanine or metal-free naphthalocyanine is then reacted with trichlorosilane, in a trichlorosilane to macrocycle ratio of from about 100:1 to about 1:1, preferably from about 30:1 to 10:1. The metal-free phthalocyanine or metal-free naphthalocyanine is preferably reacted with $HSiCl_3$ in the presence of an amine and an organic solvent. Preferably the amine is substituted with three alkyl groups, each alkyl group having from 1 to 10 carbon atoms; tri-n-propylamine is the preferred amine. The organic solvent employed in this step is inert and has a boiling point below 200° C. Suitable solvents include, for example, tetrahydrofuran, toluene, acetonitrile and $CH_2Cl_2$; $CH_2Cl_2$ is preferred. Benzene is less preferred. The reaction mixture is then hydrolyzed; and the hydrolysate is extracted with a volatile organic solvent. Preferably the volatile organic solvent has a boiling point below about 220° C. Preferred volatile solvents include, for example, toluene and $CH_2Cl_2$.

The phthalocyanines are useful as photosensitizers, as discussed in U.S. Pat. No. 5,166,179 issued Nov. 24, 1992 and U.S. Pat. No. 5,484,778 issued Jan. 16 1996; which are specifically incorporated herein by reference. The phthalocyanines are also useful as dyes.

The phthalocyanines and naphthalocyanines when employed as photosensitizers preferably absorb light in the range of 700 to 950 nm, more preferably from 790 to 830 nm, most preferably from 800 to 810 nm. A further advantage of the novel phthalocyanine compounds is that they do not aggregate; aggregated phthalocyanine compounds have short excited state lifetimes and are not photoactive or are only weakly photoactive.

The present invention also relates to phthalocyanine compounds having the following general structure:

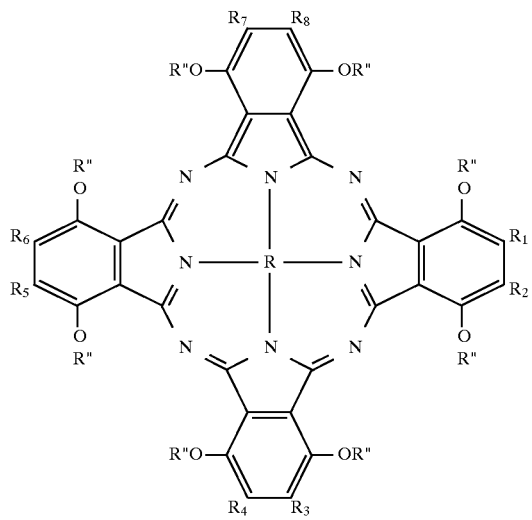

wherein:
R is $Si(OH)_2$, or $Si(OSiR'_3)_2$, where R' is an alkyl group having from 1–18 carbon atoms;
$R^1$ and $R^2$ are both H, or are joined to form a benzene ring;
$R^3$ and $R^4$ are both H, or are joined to form a benzene ring;
$R^5$ and $R^6$ are both H, or are joined to form a benzene ring;
$R^7$ and $R^8$ are both H, or are joined to form a benzene ring; and
R" is an alkyl group having from 1 to 18 carbon atoms.

Where R is $Si(OSiR'_3)_2$, R' is n—$C_6H_{33}$, R" is n—$C_4H_9$, and where: R1, R2, R3, R4, R5, R6, R7 and R8 are all H, the compound is $SiN_0P_4(OBu)_8$ $(OSi(n-C_6H_{13})_3)_2$. Where R1 and R2 are joined to form a benzene ring, and R3, R4, R5, R6, R7 and R8 are all H, the compound is $SiN_1P_3(OBu)_8$ $(OSi(n-C_6H_{13})_3)_2$; where R1 and R2 are joined to form a benzene ring; R3 and R4 are joined to form a benzene ring, and R5, R6, R7 and R8 are all H, the compound is cis-$SiN_2P_2(OBu)_8(OSi(n-C_6H_{13})_3)_2$; where R1 and R2 are joined to form a benzene ring; R5 and R6 are joined to form a benzene ring, and R3, R4, R7 and R8 are all H, the compound is trans-$SiN_2P_2$ $SiN_2P_2(OBu)8$ $(OSi(n-C_6H_{13})_3)_2$; where R1 and R2 are joined to form a benzene ring; R3 and R4 are joined to form a benzene ring; R5 and R6 are joined to form a benzene ring; and R7 and R8 are both H, the compound is $SiN_3P_1(OBu)_8(OSi(n-C_6H_{13})_3)_2$; where R1 and R2 are joined to form a benzene ring; R3 and R4 are joined to form a benzene ring; R5 and R6 are joined to form a benzene ring; and R7 and R8 joined to form a benzene ring, the compound is $SiN_4PO(OBu)_8(OSi(n-C_6H_{13})_3)_2$ also designated (SiNc $(OBu)_8$ $(OSi(n-C_6H_{13})_3)_2$.

Where R is $Si(OH)_2$, R" is n—$C_4H_9$, R1, R2, R3, R4, R5, R6, R7 and R8 are all H, the compound is $SiNOP_4(OBu)_8$ (OH)$_2$; where R1 and R2 are joined to form a benzene ring, and R3, R4, R5, R6, R7 and R8 are all H, the compound is SiN$_1$P$_3$(OBu)$_8$ (OH)$_2$; where R1 and R2 are joined to form a benzene ring, R3 and R4 are joined to form a benzene ring, and R5, R6, R7 and R8 are all H, the compound is cis-SiN$_2$P$_2$(OBu)$_8$(OH)$_2$; where R1 and R2 are joined to form a benzene ring, R5 and R6 are joined to form a benzene ring, and R3, R4, R7 and R8 are all H, the compound is trans-SiN$_2$P$_2$(OBu)$_8$(OH)$_2$; where R1 and R2 are joined to form a benzene ring, R3 and R4 are joined to form a benzene ring, R5 and R6 are joined to form a benzene ring, and R7 and R8 are both H, the compound is SiN$_3$P$_1$(OBu)$_8$(OH)$_2$. Where R1 and R2 are joined to form a benzene ring; R3 and R4 are joined to form a benzene ring; R5 and R6 are joined to form a benzene ring; and R7 and R8 joined to form a benzene ring, the compound is SiN$_4$P$_0$(OBu)$_8$ (OH) 2 .

The present invention also relates to phthalocyanine compounds having the following general structure:

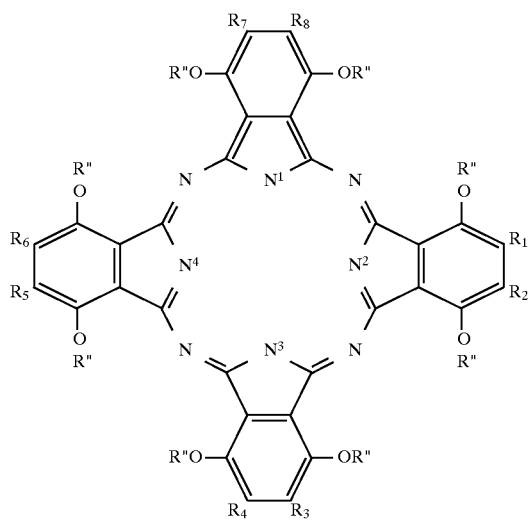

wherein:
two N, selected from the group of N1, N2, N3, and N4, have a H bound to or associated therewith;
and the structure contains from one to three benzene rings selected form the following:
a benzene ring formed by the joining of $R^1$ and $R^2$;
a benzene ring formed by the joining of $R^3$ and $R^4$;
a benzene ring formed by the joining of $R^5$ and $R^6$;
a benzene ring formed by the joining of $R^7$ and $R^8$; and
R" is an alkyl group having from 1 to 18 carbon atoms.

Where R" is n—C$_4$H$_9$, R1 and R2 are joined to form a benzene ring, and R3, R4, R5, R6, R7 and R8 are all H, the compound is H$_2$N$_1$P$_3$(OBu)$_8$; where R1 and R2 are joined to form a benzene ring, R3 and R4 are joined to form a benzene ring, and R5, R6, R7 and R8 are all H, the compound is cis-H$_2$N$_2$P$_2$(OBu)$_8$; where R1 and R2 are joined to form a benzene ring, R5 and R6 are joined to form a benzene ring, and R3, R4, R7 and R8 are all H, the compound is trans-H$_2$N$_2$P$_2$(OBu)$_8$; where R1 and R2 are joined to form a benzene ring, R3 and R4 are joined to form a benzene ring, R5 and R6 are joined to form a benzene ring, and R7 and R8 are both H, the compound is H$_2$N$_3$P$_1$(OBu)$_8$.
Preparation of Silicon Phthalocyanines and Naphthalocyanines by Silicon Insertion Silicon phthalocyanines and naphthalocyanines are made by insertion of a part of a silicon core precursor, HSiCl$_3$, into a metal-free phthalocyanine or a metal-free naphthalocyanine, for example:

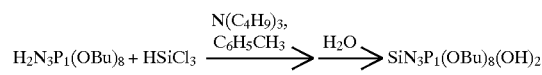

$$H_2N_3P_1(OBu)_8 + HSiCl_3 \xrightarrow[C_6H_5CH_3]{N(C_4H_9)_3,} \xrightarrow{H_2O} SiN_3P_1(OBu)_8(OH)_2$$

Since this example of the route entails the use of a reaction mixture containing tri-n-butylamine, it is believed that it involves the reaction of the ion-pairs [HN(C$_4$H$_9$)$_3$]$^+$ [HN$_{4-x}$P$_x$(OBu)$_8$]$^-$ Or [HN(C$_4$H$_9$)$_3$]$_2^+$ [N$_{4-x}$P$_x$(OBu)$_8$]$^{2-}$ with the HSiCl$_3$ or a species derived from HSiCl$_3$.

The trialkylsiloxy compounds in which the R' alkyl group has 1 to 18 carbon atoms, are made by a route similar to that used for the tri-n-hexylsiloxy compounds as disclosed in example 8, except that instead of treating the dihydroxysilicon octaalkoxyphthalocyanine or the dihydroxysilicon octaalkoxynaphthalocyanine with (n—C$_6$H$_{13}$)$_3$SiCl, a trialkylhalosilane in which the alkyl groups have from 1 to 18 carbon atoms, is employed. Such trialkylhalosilane are made by conventional reactions such as the treatment of SiCl$_4$ with Grignard reagents as described in "Organosilicon Compounds", Eaborn, C., Acedemic Press, New York, (1960) pages 167–173. H$_2$N$_{4-x}$P$_x$(OBu)$_8$ The route used for the preparation of the mixture containing H$_2$N$_{4-x}$P$_x$(OBU)$_8$, Eq. 1,

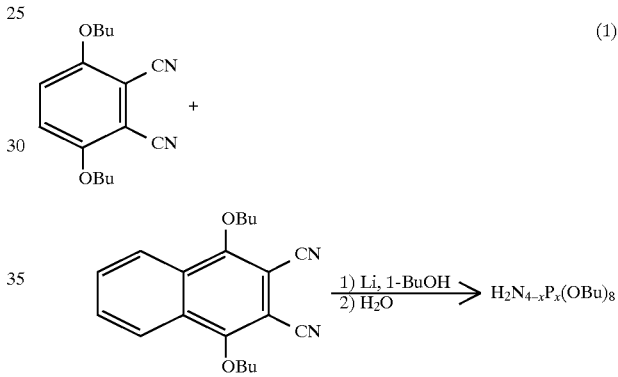

employs two nitriles instead of one. The individual compounds are readily separated by conventional techniques, such as, for example, column chromatography.

Compounds in which the R" groups contain an alkyl group having from 1–18 carbon atoms other than the butyl group are prepared by employing dialkoxydinitriles containing alkyl groups having 1 to 18 carbons other than the butyl group. Such dialkoxydinitriles containing alkyl groups having 1 to 18 carbons other than the butyl group, are made by the procedures described in "Octa-alkoxy Phthalocyanine and Naphthalocyanine Derivatives: Dyes with Q-Band Absorption in the Far Red or Near Infrared". Cook, M. J., et al., *J. Chem. Soc. Perkin Trans* 1 (1988)8 pages 2453–2458.

EXAMPLES

The following examples are intended to be illustrative and not limiting. The composition of the compounds was verified NMR spectroscopy supplemented in some cases by high-resolution fast-atom-bombardment mass spectroscopy.

Example 1

c-SiN$_2$P$_2$(OBu)$_8$ (OH)$_2$

A mixture of HSiCl$_3$ (0.70 mL, 7.0 mmol) and a solution of c—H$_2$N$_2$P$_2$(OBu)$_8$ (52 mg, 0.040 mmol), tributylamine (2.0 mL, 8.4 mmol) and toluene (10 mL) was stirred at room temperature for 44 hours. The resultant was stirred with H$_2$O (20 mL, 1.1 mol) for 30 minutes, and the hydrolysate obtained was stirred with triethylamine (10 mL, 99 mmol) for 30 minutes. The mixture formed was extracted with toluene 5 times, using about 40 mL each time, and the extracts were combined, filtered and evaporated to dryness with a rotary evaporator at 88° C. and about 5 torr. The solid was chromatographed (wet loading, toluene; $Al_2O_3$ III, toluene, 1.5×20 cm; toluene-ethyl acetate; filtration: rotary evaporation at about 45° C. and about 20 torr), washed with pentane, and dried at 60° C. and about 25 torr. About 28.6 mg of the novel compound c-$SiN_2P_2(OBu)_8$ $(OH)_2$ was produced, for a yield of about 52%. UV-vis ($\lambda_{max}$(nm), toluyene), 805. NMR analysis revealed: $^1$H NMR ($C_6D_6$): δ 9.19 (m, 1,27-Ar H; 4,24-Ar H), 7.66 (m, 2,26-Ar H; 3,25-Ar H), 7.55 (d, 10,18-Ar H). 7.40 (d, 11,17-Ar H), 5.41 (t, 28,32-OR-1 $CH_2$), 5.21 (t, 5,23-OR-1 $CH_2$), 4.94 (t, 9,19-OR-1 $CH_2$), 4.69 (t, 12,16-OR-1 $CH_2$), 2.29 (m, 5,23-OR-2 $CH_2$; 28,32-OR-2 $CH_2$), 2.21 (m, 9,19-OR-2 $CH_2$), 2.12 (m, 12,16-OR-2 $CH_2$), 1.83 (m, 28,32-OR-3 $CH_2$), 1.74 (m, 5,23-OR-3 $CH_2$), 1.57 (m, 9,19-OR-3 $CH_2$; 12,16-OR-3 $CH_2$), 1.13 (t, 28,32-OR-3 $CH_3$), 1.07 (t, 5,23-OR $CH_3$), 1.01 (t, 9,19-OR $CH_3$), 0.93 (t, 12,16-OR $CH_3$), −4.55 (s, br, OH). The compound, a dark-green solid, is soluble in toluene, $CH_2Cl_2$ and pyridine, and slightly soluble in hexane.

Example 2

$SiN_4P_0(OBu)_8(OH)_2$ $SiN_4P_0(OBu)_8$ $(OH)_2$ also designated $SiNc(OBu)_8$ $(OH)_2$, was prepared in a manner similar to that used for c-$SiN_2P_2$ $(OBu)_8$ $(OH)_2$ except that $H_2N_4P_0(OBu)_8$ was used instead of c-$H_2N_2P_2(OBu)_8$. The yield was about 78%. UV-vis ($\lambda_{max}$nm), toluene),865. $^1$H NMR ($C_6D_6$): δ 9.23 (m, 1,4, 10,13,19,22,28,31-Ar H), 7.68 (m, 2,3,11,12,20,21,29,30-Ar H), 5.35 (t, OR-1 $CH_2$), 2.35 (m, OR-2 $CH_2$), 1.65 (m, OR-3 $CH_2$), 1.03 (t, OR $CH_3$), −3.79 (s, br, OH). $^{13}$C NMR ($C_6D_6$): δ 150.98 (6,8,15,17,24,26,33,35-Ar C), 148.37 (5,9, 14,18,23,27,32,36-Ar C), 131.63 (4a,9a,13a,18a,22a,27a, 31a,36a-Ar C), 127.73 (2,3,11,12,20,21,29,30-Ar C), 124.84 (1,4,10,13,19,22,28,31-Ar C), 122.71 (5a,8a,14a,17a,23a, 26a,32a,35a-Ar C), 77.47 (OR-1 C), 33.40 (OR-2 C), 19.98 (OR-3 C), 14.48 (OR-4 C). The compound is a brown solid. It is soluble in toluene, $CH_2Cl_2$ and pyridine, and slightly soluble in hexane. Its crystals are acicular.

Example 3

$SiN_3P_1(OBu)_8(OH)_2$ $SiN_3P_1(OBu)_8(OH)_2$ was prepared in a manner similar to that used for c-$SiN_2P_2(OBu)_8$ $(OH)_2$ except that $H_2N_3P_1$ $(OBu)_8$ was used. The yield of the novel compound $SiN_3P_1$ $(OBu)_8(OH)_2$ was about 56%. UV-vis ($\lambda_{max}$(nm), toluene), 825, 861. NMR analysis revealed the following: $^1$H NMR ($C_6D_6$): δ 9.22 (m, 1,4-Ar H; 10,29-Ar H; 13,26-Ar H), 7.64 (m, 2,3-Ar H; 11,28-Ar H; 12,27-Ar H), 7.45 (s, 19,20-Ar H), 5.54 (t, 5,34-OR-1 $CH_2$), 5.36 (t, 9,30-OR-1 $CH_2$), 5.30 (t, 14,25-OR-1 $CH_2$), 4.75 (t, 18,21-OR-1 $CH_2$), 2.31 (m, 5,34-OR-2 $CH_2$; 9,30-OR-2 $CH_2$), 2.28 (m, 14,25-OR-2 $CH_2$; 18,21-OR-2 $CH_2$), 1.86 (m, 5,34-OR-3 $CH_2$; 9,30-OR-3 $CH_2$), 1.77 (m, 14,25-OR-3 $CH_2$; 18,21-OR-3 $CH_2$), 1.18 (t, 5,34-OR $CH_3$), 1.10 (t, 9,30-OR $CH_3$; 14,25-OR $CH_3$), 1.04(t, 18,21-OR $CH_3$). The compound, a brown solid, is soluble in toluene, $CH_2Cl_2$ and pyridine, and slightly soluble in hexane.

Example 4 t-$SiN_2P_2(OBu)_8(OH)_2$ t-$SiN_2P_2(OBu)_8$ $(OH)_2$, was prepared in a manner similar to that used for c-$SiN_2P_2(OBu)_8(OH)_2$ except that t-$H_2N_2P_2$ $(OBu)_8$ was used. The yield was about 43%. UV-vis ($\lambda_{max}$ (nm), toluene), 763, 859. NMR analysis revealed: $^1$H NMR ($C_6D_6$): δ 9.24 (m, 9,12,25,28-Ar H), 7.69 (m, 10,11,26,27-Ar H), 7.44 (s, 2,3,18,19-Ar H), 5.39 (t, 8,13,24,29-OR-1 $CH_2$), 4.74 (t, 1,4,17,20-OR-1 $CH_2$), 2.31 (m, 8,13,24,29-OR-2 $CH_2$), 2.16 (m, 1,4,17,20-OR-2 $CH_2$), 1.82 (m, 8,13, 24,29-OR-3 $CH_2$), 1.57 (m, 1,4,17,20-OR-3 $CH_2$), 1.13 (t, 8,13,24,29-OR $CH_3$), 0.95 (t, 1,4,17,20-OR $CH_3$). The compound, a brown solid, is soluble in toluene, $CH_2Cl_2$ and pyridine, and slightly soluble in hexane.

Example 5

SiN $P_3(OBu)_8(OH)_2$ $SiN_1P_3(OBu)_8$ $(OH)_2$ was prepared in a manner similar to that used for c-$SiN_2P_2(OBu)_8$ $(OH)_2$ except that $H_2N_1P_3$ $(OBu)_8$ was used. The yield of novel $SiN_1P_3(OBu)_8(OH)_2$ was about 69%. UV-vis ($\lambda_{max}$(nm), toluene), 762, 793. $^1$H NMR ($C_6D_6$): δ 9.21 (m, 23,26-Ar H), 7.67 (m, 24,25-Ar H), 7.53 (d, 2,17-Ar H), 7.52 (s, 9,10-Ar H), 7.40 (d, 3,16-Ar H), 5.34 (t, 22,27-OR-1 $CH_2$), 4.91 (m, 1,18-OR-1 $CH_2$; 4,15-OR-1 $CH_2$), 4.67 (t, 8,11-OR-1 $CH_2$), 2.29 (m, 22,27-OR-2 $CH_2$), 2.20 (m, 1,18-OR-2 $CH_2$; 4,15-OR-2 $CH_2$; 8,11-OR-2 $CH_2$), 1.79 (m, 22,27-OR-3 $CH_2$), 1.72 (m, 1,18-OR-3 $CH_2$; 4,15-OR-3 $CH_2$; 8,11-OR-3 $CH_2$), 1.17 (t, 22,27-OR $CH_3$), 1.12 (t, 1,18-OR $CH_3$; 4,15-OR $CH_3$), 0.93 (t, 8,11-OR $CH_3$). The compound, a dark-green solid, is soluble in toluene, $CH_2Cl_2$ and pyridine, and slightly soluble in hexane.

Example 6

$SiNOP_4(OBu)_8(OH)_2$ $SiNOP_4(OBu)_8(OH)_2$, also designated herein as SiPc $(OBu)_8(OH)_2$, was prepared in a manner similar to that used for c-$SiN_2P_2(OBu)_8(OH)_2$ except that $H_2N_0P_4(OBu)_8$ was used. The yield was about 97%. UV-vis ($\lambda_{max}$(nm) toluene), 749. NMR analysis revealed: $^1$H NMR ($C_6D_6$): δ 7.52 (s, Ar H), 4.87 (t, OR-1 $CH_2$) , 2.17 (m, OR-2 $CH_2$), 1.69 (m, OR-3 $CH_2$), 1.05 (t, OR $CH_3$). $^{13}$C NMR ($C_6D_6$): δ 152.89 (5,7,12,14,19,21,26,28-Ar C), 148.21 (1,4,8,11,15,18,22,25-Ar C), 127.47 (4a,7a,11a,14a,18a,21a,25a,28a-Ar C), 120.76 (2,3,9,10,16,17,23,24-Ar C), 73.26 (OR-1 C), 32.52 (OR-2 C), 19.94 (OR-3 C), 14.39 (OR-4 C). The $SiNOP_4$ $(OBu)_8(OH)_2$, a green solid, is soluble in toluene, $CH_2Cl_2$ and pyridine, and slightly soluble in hexane. The compound is not decomposed appreciably by treatment in succession with concentrated $H_2SO_4$, $H_2O$ and $NH_4OH$.

Example 7

$SiN_0P_4(OBu)_8(OH)_2$ $SiN_0P_4(OBu)_8$ $(OH)_2$, also designated herein as SiPc $(OBu)_8(OH)_2$ was made by an alternative synthesis to that of Example 6. A mixture of $HSiCl_3$ (0.1 mL, 1 mmol) and a solution of $H_2PC$ $(OBu)_8$ (50 mg, 0.046 mmol), N(n—$C_3H_7)_3$ (1 mL, 5.2 mmol), $CH_2Cl_2$ (15 mL) was stirred for 26 hours. The resultant was treated with 10 mL $H_2O$ and 5 mL N$(C_2H_7)_3$, and the hydrolysate was extracted three times with $CH_2Cl_2$ using 20 mL each time. The extracts were combined, filtered and evaporated to dryness with a rotary evaporator at 80° C. The solid was chromatographed (wet loading, $CH_2Cl_2$; $Al_2O_3$ III, $CH_2Cl_2$, 1.5×20 cm; $CH_2Cl_2$-ethyl acetate-$CH_3OH$; rotary evaporated at 30° C.) and dried at about 60° C. and about 25 torr. The compound weighed 45 mg, equivalent to 0.039 mmol, for a yield of 85%. The results of NMR analysis indicated that the compound was the same as that produced in example 6.

Example 8 c-SiN$_2$P$_2$ (OBu)$_8$(OSi(n—C$_6$H$_{13}$)$_3$)$_2$.

A mixture containing 28 mg, that is, 0.020 mmol c-SiN$_2$P$_2$ (OBu)$_8$(OH)$_2$, (n—C$_6$H$_{13}$)$_3$SiCl (0.50 mL, 1.6 mmol), 2 mL pyridine and 20 mL toluene was refluxed for 2 hours and evaporated to dryness with a rotary evaporator at about 25° C. and 10 torr. The solid was chromatographed (wet loading, hexane; Al$_2$O$_3$ III, hexane, 1.5×20 cm; hexane-toluene; filtration; rotary evaporation at 45° C. and about 20 torr). The solid was rechromatographed (toluene, about 0.1 g/mL; BioBeads S-X4 from Bio-Rad Labs, Richmond, Calif., 1.5×20 cm; toluene; rotary evaporation at 45° C. and about 20 torr), then dried at 60° C. and about 25 torr. The sample weight was 39.2 mg, for a yield of 96%. UV-vis ($\lambda_{max}$(nm), $\epsilon$ (M$^{-1}$cm$^{-1}$)) (toluene, 2.0 $\mu$M) : 804, 1.9×10$^5$. $^1$H NMR (C$_6$D$_6$) δ 9.22 (m, 1,27-Ar H; 4,24-Ar H), 7.66 (m, 2,26-Ar H; 3,25-Ar H), 7.57 (d, 10,18-Ar H), 7.45 (d, 11,17-Ar H), 5.66 (t, 28,32-OR-1 CH$_2$), 5.52 (t, 5,23-OR-1 CH$_2$), 5.05 (t, 9,19-OR-1 CH$_2$), 4.83 (t, 12,16-OR-1 CH$_2$), 2.41 (m, 5,23-OR-2 CH$_2$; 28,32-OR-2 CH$_2$), 2.27 (m, 9,19-OR-2 CH$_2$; 12,16-OR-2 CH$_2$), 1.80 (m, 5,23-OR-3 CH$_2$; 28,32-OR-3 CH$_2$), 1.69 (m, 9,19-OR-3 CH$_2$; 12,16-OR-3 CH$_2$), 1.18 (t, 28,32-OR CH$_3$), 1.12 (t, 5,23-OR CH$_3$), 1.10 (t, 9,19-OR CH$_3$), 1.02 (t, 12,16-OR CH$_3$), 0.84 (m, SiR-5 CH$_2$), 0.62 (t, SiR CH$_3$), 0.46 (m, SiR-3 CH$_2$; SiR-4 CH$_2$), −0.47 (m, SiR-2 CH$_2$), −1.52 (m, SiR-1 CH$_2$). $^{13}$C NMR (C$_6$D$_6$): δ 152.70 (13,15-Ar C), 152.43 (8,20-Ar C), 151.75 (12,16-Ar C), 151.28 (9,19-Ar C), 151.19 (6,22-Ar C), 149.42 (29,31-Ar C), 147.43 (5,23-Ar C), 145.56 (28,32-Ar C), 132.19 (4a, 23a-Ar C), 131.88 (27a,32a-Ar C), 127.75 (2,26-Ar C; 3,25-Ar C), 127.09 (12a,15a-Ar C), 126.15 (8a,19a-Ar C), 124.94 (1,27-Ar C), 124.86 (4,24-Ar C), 122.88 (5a,22a-Ar C), 122.15 (28a,31a-Ar C), 120.70 (10,18-Ar C), 118.19 (11,17-Ar C), 78.11 (28,32-OR-1 C), 77.85 (5,23-OR-1 C), 73.50 (9,19-OR-1 C), 72.58 (12,16-OR-1 C), 33.84 (28,32-OR-2 C; SiR-4 C), 33.49 (5,23-OR-2 C), 32.57 (9,19-OR-2 C), 32.43 (12,16-OR-2 C), 31.69 (SiR-3 C), 23.01 (SiR-5 C), 22.72 (SiR-2 C), 20.13 (5,23-OR-3 C; 28,32-OR-3 C), 20.04 (9,19-OR-3 C; 12,16-OR-3 C), 14.46 (5,23-OR-4 C; 9,19-OR-4 C; 12,16-OR-4 C; 28,32-OR-4 C; SiR CH$_3$), 14.26 (SiR-1 C). MS-HRFAB exact mass, m/z: calculated for C$_{108}$H$_{162}$N$_8$O$_{10}$Si$_3$ (M+H)$^+$, 1816.1800; found, 1816.1767, 1816.1758. The compound, a dark-green solid, is very soluble in hexane, toluene, CH$_2$Cl$_2$ and pyridine.

Example 9

SiN$_4$P$_0$(OBu)$_8$ (OSi (n—C$_6$H$_{13}$)$_3$)$_2$

SiN$_4$P$_0$(OBu)$_8$ (OSi (n—C$_6$H$_{13}$)$_3$)$_2$, also designated as SiNc (OBu)$_8$ (OSi (n—C$_6$H$_{13}$)$_3$)$_2$, was prepared in a manner similar to that used for c-SiN$_2$P$_2$(OBu)$_8$(OSi(n—C$_6$H$_{13}$)$_3$)$_2$ except that SiN$_4$P$_0$(OBu)$_8$(OH)$_2$ was used. The yield was about 94%. UV-vis ($\lambda_{max}$(nm), $\epsilon$ (M$^{-1}$cm$^{-1}$)) (toluene, 1.2 $\mu$M): 864, 2.0×10$^5$. $^1$H NMR (C$_6$D$_6$): δ 9.23 (m, 1,4,10,13, 19,22,28,31-Ar H), 7.67 (m, 2,3,11,12,20,21,29,30-Ar H), 5.55 (t, OR-1 CH$_2$), 2.46 (m, OR-2 CH$_2$), 1.77 (m, OR-3 CH$_2$), 1.10 (t, OR CH$_3$), 0.65 (m, SiR-5 CH$_2$), 0.39 (m, SiR-3 CH$_2$; SiR-4 CH$_2$; SiR CH$_3$), −0.34 (m, SiR-2 CH$_2$), −1.33 (m, SiR-1 CH$_2$). $^{13}$C NMR (C$_6$D$_6$): δ 151.01 (6,8,15, 17,24,26,33,35-Ar C), 148.28 (5,9,14,18,23,27,32 36-Ar C), 131.73 (4a,9a,13a,18a,22a,27a,31a,36a-Ar C), 127.38 (2,3, 11,12,20,21,29,30-Ar C), 124.83 (1,4,10,13,19,22,28,31-Ar C), 122.50 (5a,8a,14a,17a,23a,26a,32a,35a-Ar C), 77.73 (OR-1 C), 34.07 (SiR-4 C), 33.46 (OR-2 C), 31.77 (SiR-3 C), 22.93 (SiR-2 C; SiR-5 C), 20.11 (OR-3 C), 14.84 (SiR CH$_3$), 14.50 (OR-4 C), 13.99 (SiR-1 C). MS-HRFAB exact mass, m/z: calculated for C$_{116}$H$_{166}$N$_8$O$_{10}$Si$_3$ (M)$^+$, 1915.2034; found, 1915.2068, 1915.2067. The compound is a brown solid. It is very soluble in hexane, toluene, CH$_2$Cl$_2$ and pyridine. Its crystals are acicular.

Example 10

SiN$_3$P$_1$(OBu)$_8$ (OSi (n—C$_6$H$_{13}$)$_3$)$_2$

SiN$_3$P$_1$(OBu)$_8$ (OSi(n—C$_6$H$_{13}$)$_3$)$_2$ was prepared in a manner similar to that used for c-SiN$_2$P$_2$(OBu)$_8$ (OSi (n—C$_6$H$_{13}$)$_3$)$_2$ except that SiN$_3$P$_1$(OBu)$_8$(OH)$_2$ was used. The yield of the novel compound was about 89%. UV-vis ($\lambda_{max}$(nm) $\epsilon$(M$^{-1}$cm$^{-1}$)) (toluene, 2.2 $\mu$M): 820, 1.6×10$^5$; 857, 1.3×10$^5$. $^1$H NMR (C$_6$D$_6$): δ 9.24 (m, 1,4-Ar H; 10,29-Ar H; 13,26-Ar H), 7.67 (m, 2,3-Ar H; 11,28-Ar H; 12,27-Ar H), 7.48 (s, 19,20-Ar H), 5.66 (t, 5,34-OR-1 CH$_2$), 5.57 (t, 9,30-OR-1 CH$_2$), 5.15 (t, 14,25-OR-1 CH$_2$), 4.88 (t, 18,21-OR-1 CH$_2$), 2.44 (m, 5,34-OR-2 CH$_2$; 9,30-OR-2 CH$_2$), 2.33 (m, 14,25-OR-2 CH$_2$; 18,21-OR-2 CH$_2$), 1.87 (m, 5,34-OR-3 CH$_2$; 9,30-OR-3 CH$_2$), 1.76 (m, 14,25-OR-3 CH$_2$; 18,21-OR-3 CH$_2$), 1.18 (t, 5,34-OR CH$_3$), 1.10 (m, 9,30-OR CH$_3$; 14,25-OR CH$_3$), 1.05 (t, 18,21-OR CH$_3$), 0.75 (m, SiR-5 CH$_2$), 0.51 (t, SiR CH$_3$), 0.42 (m, SiR-3 CH$_2$; SiR-4 CH$_2$), −0.39 (m, SiR-2 CH$_2$), −1.41 (m, SiR-1 CH$_2$). $^{13}$C NMR (C$_6$D$_6$): δ 152.43 (17,22-Ar C), 151.45 (15,24-Ar C), 151.29 (8,31-Ar C), 150.87 (6,33-Ar C), 150.02 (18,21-Ar C), 149.64 (14,25-Ar C), 147.80 (9,30-Ar C), 146.02 (5,34-Ar C), 132.06(4a,34a-Ar C), 131.91 (9a,29a-Ar C), 131.56(13a,25a-Ar C), 127.53 (2,3-Ar C), 127.40 (11,28-Ar C; 12,27-Ar C), 126.13 (17a,21a-Ar C), 124.89 (1,4-Ar C; 10,29-Ar C), 124.78 (13,26-Ar C), 122.86 (5a,33a-Ar C), 122.51 (8a,30a-Ar C), 122.23 (14a,24a-Ar C), 118.68 (19, 20-Ar C), 77.95 (5,34-OR-1 C), 77.85 (9,30-OR-1 C), 77.76 (14,25-OR-1 C), 72.75 (18,21-OR-1 C), 33.97 (SiR-4 C), 33.73 (5,34-OR-2 C), 33.50 (9,30-OR-2 C), 33.45 (14,25-OR-2 C), 32.45 (18,21-OR-2 C), 31.74 (SiR-3 C), 22.98 (SiR-5 C), 22.84 (SiR-2 C), 20.11 (5,34-OR-3 C; 9,30-OR-3 C; 14,25-OR-3 C; 18,21-OR-3 C), 14.66 (SiR-CH$_3$), 14.50 (5,34-OR-4 C; 9,30-OR-4 C; 14,25-OR-4 C; 18,21-OR-4 C), 14.14 (SiR-1 C). MS-HRFAB exact mass, m/z: calcd for C$_{112}$H$_{164}$N$_8$O$_{10}$Si$_3$ (M)$^+$, 1865.1878; found, 1865.1915, 1865.1974. The compound, a brown solid, is very soluble in toluene, hexane, CH$_2$Cl$_2$ and pyridine.

Example 11 t-SiN$_2$P$_2$(OBU)$_8$(OSi (n—C$_6$H$_{13}$)$_3$)$_2$ t-SiN$_2$P$_2$ (OBu)$_8$ (OSi (n—C$_6$H$_{13}$)$_3$)$_2$ was prepared in a manner similar to that used for c-SiN$_2$P$_2$(OBu)$_8$ (OSi (n—C$_6$H$_{13}$)$_3$)$_2$ except that t-SiN$_2$P$_2$(OBU)$_8$(OH)$_2$ was used. The yield was about 79a. UV-vis ($\lambda_{max}$(nm) $\epsilon$ (M$^{-1}$cm$^{-1}$)) (toluene, 1.5 $\mu$M): 760, 1.5×10$^5$; 851, 1.2×10$^5$. $^1$H NMR (C$_6$D$_6$) : δ 9.24 (m, 9,12,25,28-Ar H), 7.68 (m, 10,11,26, 27-Ar H), 7.50 (s, 2,3,18,19-Ar H), 5.62 (t, 8,13,24,29-OR-1 CH$_2$), 4.89 (t, 1,4,17,20-OR-1 CH$_2$), 2.38 (m, 8,13,24,29-OR-2 CH$_2$), 2.32 (m, 1,4,17,20-OR-2 CH$_2$), 1.84 (m, 8,13, 24,29-OR-3 CH$_2$), 1.70 (m, 1,4,17,20-OR-3 CH$_2$), 1.18 (t, 8,13,24,29-OR CH$_3$), 1.04 (t, 1,4,17,20-OR CH$_3$), 0.85 (m, SiR-5 CH$_2$), 0.62 (t, SiR CH$_3$), 0.45 (m, SiR-3 CH$_2$; SiR-4 CH$_2$), −0.49 (m, SiR-2 CH$_2$), −1.56 (m, SiR-1 CH$_2$). $^{13}$C NMR (C$_6$D$_6$): δ 152.67 (5,16,21,32-Ar C), 151.12 (1,4,7, 20-Ar C), 149.02 (7,14,23,30-Ar C; 8,13,24,29-Ar C), 131.37 (8a,12a,24a,28a-Ar C), 127.75 (10,11,26,27-Ar C), 126.95 (4a,16a,20a,32a-Ar C), 126.41 (7a,13a,23a,29a-Ar C), 124.82 (9,12,25,28-Ar C), 119.52 (2,3,18,19-Ar C), 78.00 (8,13,24,29-OR-1 C), 72.86 (1,4,17,20-OR-1 C), 33.81 (SiR-4 C), 33.73 (8,13,24,29-OR-2 C), 32.47 (1,4,17, 20-OR-2 C), 31.68 (SiR-3 C), 23.00 (SiR-5 C), 22.69 (SiR-2 C), 20.10 (1,4,17,20-OR-3 C; 8,13,24,29-OR-3 C), 14.49 (1,4,17,20-OR-4 C; 8,13,24,29-OR-4 C), 14.41 (SiR $CH_3$), 14.26 (SiR-1 C). MS-HRFAB exact mass, m/z: calculated for $C_{108}H_{162}N_8O_{10}Si_3(M+H)^+$, 1816.1800; found, 1816.1742, 1816.1775. The compound is a brown solid. It is very soluble in hexane, toluene, $CH_2Cl_2$, and pyridine.

Example 12

$SiN_1P_3(OBu)_8(OSi(n-C_6H_{13})_3)_2$

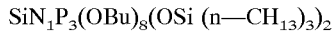

$SiN_1P_3(OBu)_8OSi(n-C_6H_{13})_3)_2$ was prepared in a manner similar to that used for c-$SiN_2P_2(OBu)_8$ (OSi (n—$C_6H_{13}$)$_3$)$_2$ except that $SiN_1P_3(OBu)_8$ (OH)$_2$ was used. The yield of this novel compound was about 69%. UV-vis ($\lambda_{max}$(nm), ε ($M^{-1}cm^{-1}$)) (toluene, 2.1 μM) : 761, 2.2×10$^5$; 794, 1.5×10$^5$. $^1$H NMR ($C_6D_6$): δ 9.22 (m 23,26-Ar H), 7.67 (m, 24,25-Ar H), 7.58 (d, 2,17-Ar H), 7.55 (s, 9,10-Ar H), 7.45 (d, 3,16-Ar H), 5.62 (t, 22,27-OR-1 $CH_2$), 5.06 (t, 1,18-OR-1 $CH_2$), 5.01 (t, 4,15-OR-1 $CH_2$), 4.83 (t, 8,11-OR-1 $CH_2$), 2.36 (m, 22,27-OR-2 $CH_2$), 2.28 (m, 1,18-OR-2 $CH_2$; 4,15-OR-2 $CH_2$; 8,11-OR-2 $CH_2$), 1.78 (m, 22,27-OR-3 $CH_2$), 1.68 (m, 1,18-OR-3 $CH_2$; 4,15-OR-3 $CH_2$; 8,11-OR-3 $CH_2$), 1.17 (t, 22,27-OR $CH_3$), 1.12 (m, 1,18-OR $CH_3$; 4,15-OR $CH_3$), 1.02 (t, 8,11-OR $CH_3$), 0.92 (m,SiR-5 $CH_2$), 0.72 (t, SiR $CH_3$), 0.55 (m, SiR-4 $CH_2$), 0.42 (m, SiR-3 $CH_2$), −0.58 (m, SiR-2 $CH_2$), −1.67 (m, SiR-1 $CH_2$). $^{13}$C NMR ($C_6D_6$): δ 152.95 (7,12-Ar C), 152.74 (5,14-Ar C; 19,30-Ar C), 152.69 (21,28-Ar C), 151.63 (1,18-Ar C; 4,15-Ar C; 8,11-Ar C), 150.20 (22,27-Ar C), 131.99 (22a, 26a-Ar C), 127.35 (24,25-Ar C), 127.11 (7a,11a-Ar C), 126.94 (21a,27a-Ar C), 126.43 (4a,14a-Ar C; 18a,30a-Ar C), 124.89 (23,26-Ar C), 121.57 (2,17-Ar C), 120.17 (3,16-Ar C), 118.96 (9,10-Ar C), 78.15 (22,27-OR-1 C), 73.67 (1,18-OR-1 C; 4,15-OR-1 C), 72.65 (8,11-OR-1 C), 33.70 (22,27-OR-2 C; SiR-4 C), 32.61 (1,18-OR-2 C), 32.54 (4,15-OR-2 C), 32.44 (8,11-OR-2 C), 31.64 (SiR-3 C), 23.04 (SiR-5 C), 22.56 (SiR-2 C), 20.12 (1,18-OR-3 C; 22.27-OR-3 C), 20.03 (4,15-OR-3 C; 8,11-OR-3 C), 14.39 (1,18-OR-4 C; 4,15-OR-4 C; 8,11-OR-4 C; 22,27-OR-4 C; SiR $CH_3$), 14.20 (SiR-i C). MS-HRFAB exact mass, m/z: calcd for $C_{104}H_{160}N_8O_{10}Si_3$ (M)$^+$, 1765.1565; found, 1765.1583, 1765.1527. The compound is a dark-green solid. It is very soluble in hexane, toluene, $CH_2Cl_2$ and pyridine.

Example 13

$SiNOP_4(OBu)_8$ $(OSi(n-C_6H_{13})_3)_2$ $SiNOP_4(OBu)_8(OSi(n-C_6H_{13})_3)_2$ also designated as (SiPc(OBu)$_8$(Osi(n—$C_6H_{13}$)$_3$)$_2$, was prepared in a manner similar to that used for c-$SiN_2P_2(OBu)_8$ (OSi (n—$C_6H_{13}$)$_3$)$_2$ except that $SiN_0P_4(OBu)_8$ (OH)$_2$ was used. The yield was about 88%. UV-vis ($\lambda_{max}$(nm) ε ($M^{-1}cm^{-1}$)) (toluene, 1.7 μM): 747, 2.3×10$^5$. $^1$H NMR ($C_6D_6$): δ 7.57 (s, Ar H) , 5.03 (t, OR-1 $CH_2$), 2.27 (m, OR-2 $CH_2$) 1.77 (m, OR-3 $CH_2$), 1.11 (t, OR $CH_3$), 0.99 (m, SiR-5 $CH_2$), 0.82 (t, SiR $CH_3$), 0.59 (m, SiR-4 $CH_2$), 0.39 (m, SiR-3 $CH_2$), −0.70 (m SiR-2 $CH_2$), −1.83 (m, SiR-1 $CH_2$). $^{13}$C NMR ($C_6D_6$): δ 153.02 (5,7,12,14,19,21,26,28-Ar C), 148.16 (1,4,8,11,15,18,22,25-Ar C), 127.38 (4a,7a,11a,14a,18a,21a,25a,28a-Ar C), 121.07 (2,3,9,10,16,17,23,24-Ar C), 73.53 (OR-1 C), 33.58 (SiR-4 C), 32.58 (OR-2 C), 31.58 (SiR-3 C), 23.07 (SiR-5 C), 22.40 (SiR-2 C), 20.02 (OR-3 C), 14.50 (SiR $CH_3$), 14.43 (OR-4 C), 13.91 (SiR-1 C). MS-HRFAB exact mass, m/z: calcd for $C_{100}H_{158}N_8O_{10}Si_3$ (M)$^+$, 1715.1408; found, 1715.1384, 1715.1453

The compound, a green solid, is very soluble in hexane, toluene, $CH_2Cl_2$ and pyridine.

Example 14

$SiPc(dib)_4(OBu)_8(OH)_2$

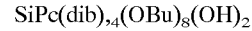

$SiPc(dib)_4(OBu)_8(OH)_2$ has a structure similar to $SiN_4P_0$ (OBu)$_8$(OH)$_2$, except that R1 and R2 are joined to form a triptycene ring; R3 and R4 are joined to form a triptycene ring; R5 and R6 are joined to form a triptycene ring; and R7 and R8 joined to form a triptycene ring, rather than benzene rings. The starting material, $H_2Pc(dib)_4$ (OBu)$_8$ is made according to the process disclosed in Rihter, B. D., et al., "Two New Sterically Hindered Phthalocyanines: Synthetic and Photodynamic Aspects", *Photochemistry and Photobiology* (1992) Volume 55, pages 677–680.

Under Ar, a mixture of HSiCl$_3$ (0.15 mL, 1.6 mmol) and a solution of H$_2$Pc(dib)$_4$(OBu)$_8$ (103 mg, 0.0574 mmol), N(n—$C_3H_7$)$_3$ (5 mL, 26 mmol), $CH_3CN$ (20 mL), and tetrahydrofuran (20 mL) that had been dried by distilling off about 5 mL of distillate was stirred at room temperature for 10 minutes, refluxed for 3 hours, and stirred at room temperature for 60 hours. The resulting slurry was treated with 30 mL H$_2$O and 20 mL N($C_2H_5$)$_3$, and extracted with $CH_2Cl_2$ (3 times, 50 mL each time). The extracts were combined, filtered and evaporated to dryness by rotary evaporation at 80° C. and about 20 torr. The solid was chromatographed (wet loading, toluene; Al$_2$O$_3$ III, toluene, 1.5×20 cm; toluene-ethyl acetate; filtration; rotary evaporation at 45° C. and about 20 torr). The solid was rechromatographed (toluene, about 0.1 g/mL; Biobeads S-X4, 1.5×20 cm; toluene; rotary evaporation at 45° C. and about 20 torr), and dried at about 60° C. and 25 torr. About 48 mg, that is, 0.026 mmol, of the novel compound was produced, providing a yield of about 45%.

UV-vis ($\lambda_{max}$(nm), ε ($M^{-1}cm^{-1}$)) (toluene, 1.8 μM): 745, 2.7×10$^5$. $^1$H NMR($C_6D_6$): δ 7.64 (m, 1,4,12,15,23,26,34,37, 51,54,57,60,63,66, 69,72-Ar H), 7.01 (m,2,3,13,14,24,25, 35,36,52,53,58,59,64,65,70, 71-Ar H), 6.75 (s,5,11,16,22, 27,33,38,44-CH), 5.06 (t, OR-1 $CH_2$), 2.34 (m, OR-2 $CH_2$), 1.63 (m, OR-3 $CH_2$), 1.18 (t, OR $CH_3$), −5.40(s, br, OH). MS-HRFAB exact mass, m/z: calculated for $C_{120}H_{114}N_8O_{10}Si$ (M)$^+$, 1854.8427; found, 1854.8504, 1854.8451.

Example 15

$SiPc(OEt)_8(OH)_2$

A mixture of HSiCl$_3$ (0.2 mL, 2 mmol) and a solution of H$_2$Pc(OEt) B (106 mg, 0.12 mmol), N(n—$C_3H_7$)$_3$ (4 mL, 21 mmol), $CH_2Cl_2$ (40 mL) was stirred for 48 hours. The resultant was treated with H$_2$O (20 mL) and N($C_2H_5$)$_3$ (10 mL), and the hydrolysate was extracted with $CH_2Cl_2$ 3 times, using 20 mL each time. The extracts were combined, filtered and evaporated to dryness with a rotary evaporator at 80° C. The solid was chromatographed (wet loading, $CH_2Cl_2$; Al$_2$O$_3$ III, $CH_2Cl_2$, 1.5×20 cm; $CH_2Cl_2$-ethyl acetate; rotary evaporation at 30° C., and dried at about 60° C. and 25 torr. The compound weighed 98 mg, equivalent to 0.10 mmol and thus the yield was 88%. UV-vis ($\lambda_{max}$nm) toluene): 747. $^1$H NMR ($C_6D_6$): δ 7.45 (s, Ar H), 4.81 (t, OR $CH_2$), 1.65 (t, OR $CH_3$). The compound is a green solid, is soluble in $CH_2Cl_2$ and slightly soluble in toluene. The results of NMR analysis showed that the desired compound had been made.

11

Example 16

$H_2N_4P_0(OBu)_8$ $H_2N_4P_0(OBu)_8$ also designated $H_2Nc(OBu)_8$, was prepared as follows. Under Ar, a mixture of 3,6-dibutoxy-1,2-benzenedicarbonitrile (279 mg, 1.00 mmol), 1,4-dibutoxy-2,3-naphthalenedicarbonitrile (326 mg, 1.00 mmol) and 1-butanol (22 mL) was brought to reflux, treated with Li shot (pentane washed, 450 mg, 65.0 mmol), refluxed for 1 hour and cooled. The resulting solution was stirred with $H_2O$ (25 mL, 1.4 mol) for 2.5 hours, and the hydrolysate obtained was extracted with toluene by stirring it with 50 mL toluene five times. The extracts were combined, filtered and evaporated to dryness with a rotary evaporator at 60° C. and about 30 torr, and the solid was extracted with 50 mL of toluene. The extract was evaporated to dryness with a rotary evaporator at 60° C. and about 30 torr. About 600 mg of the product, which is designated $H_2N_{4-x}P_x(OBu)_8$, and which is a mixture of $H_2N_4P_0(OBU)_8$, $H_2N_3P_1(OBu)_8$, c—$H_2N_2P_2(OBu)_8$, t-$H_2N_2P_2(OBu)_8$, $H_2N_1P_3(OBu)_8$, and $H_2N_0P_4(OBu)_8$, was produced. $H_2N_{4-x}P_x(OBu)_8$, a greenish-brown solid, is soluble in toluene, $CH_2Cl_2$ and pyridine, and slightly soluble in hexane. $H_2N_4P_0(OBu)_8$ also designated "$H_2Nc(OBu)_8$" was isolated from the $H_2N_4XPX(OBu)_8$ mixture by subjecting 600 mg of the $H_2N_{4-x}P_x(OBU)_8$ to column chromatography (wet loading, hexane; $Al_2O_3$ III, hexane, 1.5×20 cm; hexane; filtration; rotary evaporation at 45° C. and about 20 torr). The solid isolated was washed with 5 mL pentane, dried at about 60° C and about 25 torr. The $H_2N_4P_0(OBu)_8$ weighed 5 mg, which represented a yield of 1% of weight of $H_2N_{4-x}P_x(OBu)_8$. UV-vis ($\lambda_{max}$(nm), $\epsilon$ ($M^{-1}cm^{-1}$)) (toluene, 2.1 $\mu$M): 862, 2.0×10⁵. NMR analysis revealed: ¹H NMR ($C_6D_6$): δ 9.23 (m, 1,4,10,13,19,22,28,31-Ar H), 7.68 (m, 2,3,11,12,20,21,29,30-Ar H), 5.40 (t, OR-1 $CH_2$), 2.38 (m, OR-2 $CH_2$), 2.27 (s, NH), 1.67 (m, OR-3 $CH_2$), 1.03 (t, OR $CH_3$). ¹³C NMR ($C_6D_6$): δ 150.59 (5,9,14,18,23,27,32,36-Ar C; 6,8,15,17,24,26,33,35-Ar C), 131.54 (4a,9a,13a,18a,22a,27a,31a,36a-Ar C), 127.60 (2,3,11,12,20,21,29,30-Ar C), 124.91 (1,4,10,13,19,22,28,31-Ar C), 123.51 (5a,8a,14a,17a,23a,26a,32a,35a-Ar C), 77.24 (OR-1 C), 33.34 (OR-2 C), 20.07 (OR-3 C), 14.49 (OR-4 C). The $H_2N_4P_0(OBu)_8$, a brown solid, is soluble in toluene, $CH_2Cl_2$, pyridine and slightly soluble in hexane.

Example 17

$H_2N_3P_1(OBu)_8$ $H_2N_3P_1(OBu)_8$ was isolated from the $H_2N_{4-x}P_x(OBu)_8$ mixture of example 16 by continuing the chromatography with toluene. The fraction isolated yielded 34 mg of the novel compound $H_2N_3P_1(OBu)_8$, which represents 6% of weight of $H_2N_{4-x}P_x(OBu)_8$. UV-vis ($\lambda_{max}$nm) $\epsilon$ ($M^{-1}cm^{-1}$)) (toluene, 1.9 $\mu$M) 814, 0.99×10⁵; 851, 0.89×10⁵. ¹H NMR ($C_6D_6$) δ 9.23 (m, 1,4-Ar H; 10,29-Ar H; 13,26-Ar H), 7.69 (m, 2,3-Ar H; 11,28-Ar H; 12,27-Ar H), 7.44 (s, 19,20-Ar H), 5.55 (t, 5,34-OR-1 $CH_2$), 5.39 (t, 9,30-OR-1 $CH_2$), 5.31 (t, 14,25-OR-1 $CH_2$), 4.75 (t, 18,21-OR-1 $CH_2$), 2.34 (m, 5,34-OR-2 $CH_2$; 9,30-OR-2 $CH_2$), 2.24 (m, 14,25-OR-2 $CH_2$; 18,21-OR-2 $CH_2$), 1.91 (s, NH), 1.85 (m, 5,34-OR-3 $CH_2$; 9,30-OR-3 $CH_2$), 1.66 (m, 14,25-OR-3 $CH_2$; 18,21-OR-3 $CH_2$), 1.13 (t, 5,34-OR $CH_3$), 1.02 (m, 9,30-OR $CH_3$; 14,25-OR $CH_3$), 0.96 (t, 18,21-OR $CH_3$). ¹³C NMR ($C_6D_6$) δ 152.22 (17,22-Ar C), 151.50 (18,21-Ar C), 150.63 (5,34-Ar C; 6,33-Ar C), 149.99 (8,31-Ar C; 9,30-Ar C; 14,25-Ar C; 15,24-Ar C), 131.97 (4a,34a-Ar C), 131.67 (9a,29a-Ar C; 13a,25a-Ar C), 127.73 (17a,21a-Ar C), 127.53 (2,3-Ar C), 127.41 (11,28-Ar C; 12,27-Ar C), 125.69 (1,4-Ar C), 124.91

12

(10,29-Ar C; 13,26-Ar C), 121.42(5a,33a-Ar C; 8a,30a-Ar C; 14a,24a-Ar C), 117.28 (19,20-Ar C), 77.35 (5,34-OR-1 C; 9,30-OR-1 C), 77.27 (14,25-OR-1 C), 72.23 (18,21-OR-1 C), 33.67 (5,34-OR-2 C), 33.31 (9,30-OR-2 C; 14,25-OR-2 C), 32.37 (18,21-OR-2 C), 20.33 (5,34-OR-3 C), 20.12 (9,30-OR-3 C; 14,25-OR-3 C), 20.03 (18,21-OR-3 C), 14.46 (5,34-OR-4 C; 9,30-OR-4 C; 14,25-OR-4 C; 18,21-OR-4 C). MS-HRFAB exact mass, m/z: calculated for $C_{76}H_{88}N_8O_8$ (M+H)⁺, 1241.6803; the mass found was 1241.6807, 1241.6795. The $H_2N_3P_1(OBu)_8$, a brown solid, is soluble in toluene, $CH_2Cl_2$, pyridine and slightly soluble in hexane.

Example 18 c-$H_2N_2P_2(OBu)_8$ c-$H_2N_2P_2(OBu)_8$ was isolated from the $H_2N_2P_2(OBu)_8$ mixture of Example 16 by continuing the chromatography with a 1:1 mixture of toluene and $CH_2Cl_2$. The fraction separated yielded 62 mg of the novel compound c-$H_2N_2P_2(OBu)_8$, which represents 10% of weight of $H_2N_{4-x}P_x(OBu)_8$. UV-vis ($\lambda_{max}$(nm), $\epsilon$ ($M^{-1}cm^{-1}$)) (toluene, 2.2 $\mu$M): 807, 1.9×10⁵. ¹H NMR ($C_6D_6$): δ 9.21 (m, 1,27-Ar H; 4,24-Ar H), 7.67 (m, 2,26-Ar H; 3,25-Ar H), 7.52 (d, 10,18-Ar H), 7.40 (d, 11,17-Ar H), 5.51 (t, 28,32-OR-1 $CH_2$), 5.30 (t, 5,23-OR-1 $CH_2$), 4.95 (t, 9,19-OR-1 $CH_2$), 4.71 (t, 12,16-OR-1 $CH_2$), 2.31 (m, 5,23-OR-2 $CH_2$; 28,32-OR-2 $CH_2$), 2.20 (m, 9,19-OR-2 $CH_2$; 12,16-OR-2 $CH_2$), 1.80 (m, 5,23-OR-3 $CH_2$; 28,32-OR-3 $CH_2$), 1.62 (m, 9,19-OR-3 $CH_2$; 12,16-OR-3 $CH_2$), 1.54 (s, NH), 1.10 (t, 28,32-OR $CH_3$), 1.06 (t, 5,23-OR $CH_3$), 1.00 (t, 9,19-OR $CH_3$), 0.94 (t, 12,16-OR $CH_3$). ¹³C NMR ($C_6D_6$): δ 152.38 (13,15-Ar C), 152.20 (8,20-Ar C; 9,19-Ar C; 12,16-Ar C), 150.70 (6,22-Ar C; 29,31-Ar C), 150.33 (5,23-Ar C; 28,32-Ar C) 131.98 (27a, 32a-Ar C), 131.21 (4a,23a-Ar C), 126.85 (8a,19a-Ar C; 12a,15a-Ar C), 127.75 (2,26-Ar C; 3,25-Ar C), 125.01 (1,27-Ar C), 124.92 (4,24-Ar C), 123.71 (5a,22a-Ar C), 123.11 (28a,31a-Ar C). 119.89 (10,18-Ar C), 117.59 (11, 17-Ar C), 77.50 (28,32-OR-1 C), 77.29 (5,23-OR-1 C), 72.98 (9,19-OR-1 C), 72.16 (12,16-OR-1 C), 33.61 (28,32-OR-2 C), 33.29 (5,23-OR-2 C), 32.53 (9,19-OR-2 C), 32.38 (12,16-OR-2 C), 20.09 (5,23-OR-3 C; 28,32-OR-3 C), 20.01 (9,19-OR-3 C; 12,16-OR-3 C), 14.44 (5,23-OR-4 C; 9,19-OR-4 C; 12,16-OR-4 C; 28,32-OR-4 C). MS-HRFAB exact mass, m/z calculated for $C_{72}H_{86}N_8O_8$ (M+H)⁺, is 1191.6647; the mass found, was 1191.6677, 1191.6598.

The c-$H_2N_2P_2(OBu)_8$, a dark-green solid, is soluble in toluene, $CH_2Cl_2$ pyridine and slightly soluble in hexane.

Example 19 t-$H_2N_2P_2(OBu)_8$ t-$H_2N_2P_2(OBu)_8$ was isolated from the $H_2N_{4-x}P_x(OBu)_8$ mixture of Example 16 by continuing the chromatography with $CH_2Cl_2$. The resulting fraction yielded 12 mg of t-$H_2N_2P_2(OBu)_8$ which represents 2% of weight of $H_2N_{4-x}P_x(OBu)_8$. UV-vis ($\lambda_{max}$(nm) $\epsilon$ ($M^{-1}cm^{-1}$)) (toluene, 1.7 $\mu$M) : 750, 0.98×10⁵; 852, 0.75×10⁵. ¹H NMR ($C_6D_6$): δ 9.23 (m, 9,12,25,28-Ar H), 7.69 (m, 10,11,26,27-Ar H), 7.47 (s, 2,3,18,19-Ar H), 5.48 (t, 8,13,24,29-OR-1 $CH_2$), 4.75 (t, 1,4,17,20-OR-1 $CH_2$), 2.32 (m, 8,13,24,29-OR-2 $CH_2$), 2.22 (m, 1,4,17,20-OR-2 $CH_2$), 1.83 (m, 8,13,24,29-OR-3 $CH_2$), 1.60 (m, 1,4,17,20-OR-3 $CH_2$), 1.11 (t, 8,13,24,29-OR $CH_3$), 0.95 (t, 1,4,17,20-OR $CH_3$). ¹³C NMR ($C_6D_6$): δ 152.20 (1,4,17,20-Ar C; 5,16,20,32-Ar C), 150.72 (7,14,23, 30-Ar C; 8,13,24,29-Ar C), 131.89(8a,12a,24a,28a-Ar C), 127.36 (10,11,26,27-Ar C), 127.17 (4a,16a,20a,32a-Ar C), 126.15 (7a,13a,23a,29a-Ar C), 125.02 (9,12,25,28-Ar C), 118.32 (2,3,18,19-Ar C), 77.42 (8,13,24,29-OR-1 C), 72.37 (1,4,17,20-OR-1 C), 33.65 (8,13,24,29-OR-2 C), 32.35 (1,4, 17,20-OR-2 C), 20.10 (1,4,17,20-OR-3 C; 8,13,24,29-OR-3 C), 14.46 (1,4,17,20-OR-4 C; 8,13,24,29-OR-4 C). MS-HRFAB exact mass, m/z: calculated for $C_{72}H_{86}N_8O_8$ $(M+H)^+$, 1191.6647; the mass found, was 1191.6632, 1191.6592. The t-$H_2N_2P_2(OBu)_8$, a brown solid, is soluble in toluene, $CH_2Cl_2$, pyridine and slightly soluble in hexane.

Example 20

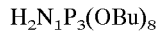

$H_2N_1P_3(OBu)_8$ was isolated from the $H_2N_{4-x}P_x(OBu)_8$ mixture of Example 16 by continuing the chromatography with a 1:1 mixture of toluene and ethyl acetate. The fraction isolated yielded 102 mg of the novel compound $H_2N_1P_3(OBu)_8$, which represents 17% of weight of $H_2N_{4-x}P_x(OBu)_8$. UV-vis ($\lambda_{max}$nm), $\epsilon$ ($M^{-1}cm^{-1}$)) (toluene, 1.5 $\mu$M) 756, 0.82×10$^5$; 802, 0.66×10$^5$. $^1$H NMR ($C_6D_6$) δ 9.22 (m, 23,26-Ar H), 7.68 (m, 24,25-Ar H), 7.56 (d, 2,17-Ar H), 7.51 (s, 9,10-Ar H), 7.43 (d, 3,16-Ar H), 5.45 (t, 22,27-OR-1 $CH_2$), 4.94 (m, 1,18-OR-1 $CH_2$; 4,15-OR-1 $CH_2$), 4.70 (t, 8,11-OR-1 $CH_2$), 2.30 (m, 22,27-OR-2 $CH_2$), 2.21 (m, 1,18-OR-2 $CH_2$; 4,15-OR-2 $CH_2$; 8,11-OR-2 $CH_2$), 1.78 (m, 22,27-OR-3 $CH_2$), 1.75 (m, 1,18-OR-3 $CH_2$; 4,15-OR-3 $CH_2$; 8,11-OR-3 $CH_2$), 1.18 (t, 22,27-OR $CH_3$), 1.13 (m, 1,18-OR $CH_3$; 4,15-OR $CH_3$), 0.93 (t, 8,11-OR $CH_3$), 0.63 (s, NH). $^{13}$C NMR ($C_6D_6$): δ 152.62 (21,28-Ar C), 152.41 (1,18-Ar C; 4,15-Ar C; 5,14-Ar C; 7,12-Ar C; 8,11-Ar C; 19,30-Ar C), 150.73 (22,27-Ar C) 132.02 (22a,26a-Ar C), 129.84 (7a,11a-Ar C), 127.35 (24,25-Ar C), 126.04 (21a,27a-Ar C), 125.30 (4a,14a-Ar C; 18a,30a-Ar C), 125.05 (23,26-Ar C), 120.36 (2,17-Ar C), 120.05 (3,16-Ar C), 118.05 (9,10-Ar C), 77.50 (22,27-OR-1 C), 73.00 (1,18-OR-1 C; 4,15-OR-1 C), 72.22 (8,11-OR-1 C), 33.63 (22,27-OR-2 C), 32.57 (1,18-OR-2 C), 32.47 (4,15-OR-2 C), 32.35 (8,11-OR-2 C), 20.07 (1,18-OR-3 C; 22,27-OR-3 C), 19.99 (4,15-OR-3 C; 8,11-OR-3 C), 14.39 (1,18-OR-4 C; 4,15-OR-4 C; 8,11-OR-4 C; 22,27-OR-4 C). MS-HRFAB exact mass, m/z calcd for $C_{68}H_{84}N_8O_8$ $(M+H)^+$, 1141.6490; found, 1141.6453, 1141.6449. The $H_2N_1P_3(OBu)$ a dark-green solid, is soluble in toluene, $CH_2Cl_2$, pyridine and slightly soluble in hexane.

Example 21

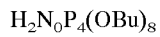

$H_2N_0P_4(OBu)_8$, also designated ($H_2PC(OBu)_8$) was isolated from the $H_2N_{4-x}P_x(OBu)_8$ mixture of Example 16 by continuing the chromatography with ethyl acetate. The fraction separated provided 30 mg of $H_2N_0P_4(OBu)_8$, which represents 5% of weight of $H_2N_{4-x}P_x(OBu)_8$. UV-vis ($\lambda_{max}$nm), $\epsilon$ ($M^{-1}cm^{-1}$)) (toluene, 2.1 $\mu$M) 739, 0.95×10$^5$, 761, 1.1×10$^5$. $^1$H NMR ($C_6D_6$): δ 7.53 (s, Ar H), 4.91 (t, OR-1 $CH_2$), 2.20 (m, OR-2 $CH_2$), 1.72 (m, OR-3 $CH_2$), 1.04 (t, OR $CH_3$), −0.28 (s, NH). $^{13}$C NMR ($C_6D_6$): δ 152.63 (5,7,12,14,19,21,26,28-Ar C), 149.20 (1,4,8,11,15,18,22,25-Ar C), 127.75 (4a,7a,11a,14a,18a,21a,25a,28a-Ar C), 120.33 (2,3,9,10,16,17,23,24-Ar C), 73.01 (OR-1 C), 32.51 (OR-2 C), 19.98 (OR-3 C), 14.37 (OR-4 C). The $H_2N_0P_4(OBu)_8$, a green solid, is soluble in toluene, $CH_2Cl_2$, pyridine and slightly soluble in hexane.

The amounts of the various compounds in the mixture the $H_2N_{4-x}P_x(OBu)_8$ obtained are not those predicted statistically on the assumption that the two nitriles contribute to ring formation equally; the results are shown in Table I.

TABLE I

Amounts of Components in $H_2N_{4-x}P_x(OBu)_8$ Mixture (%)

| | $H_2N_4P_0$ | $H_2N_3P_1$ | c-$H_2N_2P_2$ | t-$H_2N_2P_2$ | $H_2N_1P_3$ | $H_2N_0P_4$ |
|---|---|---|---|---|---|---|
| statistical | 5 | 18 | 27 | 27 | 18 | 5 |
| actual | 2 | 15 | 24 | 5 | 41 | 12 |
| difference | −3 | −3 | −3 | −22 | +23 | +7 |

The solubility of the octabutoxy compounds of the Examples was determined in hexane, toluene, $CHCl_3$, pyridine and $CH_2Cl_2$ and are presented in Table II.

TABLE II

| | | Solubility | | | | |
|---|---|---|---|---|---|---|
| Ex | Compound | hexane | toluene | $CHCl_3$ | pyridine | $CH_2Cl_2$ |
| 1 | c-$SiN_2P_2(OBu)_8(OH)_2$ | ss | s | s | s | s |
| 2 | $SiN_4P_0(OBu)_8(OH)_2$ | ss | s | s | s | s |
| 3 | $SiN_3P_1(OBu)_8(OH)_2$ | ss | s | s | s | s |
| 4 | t-$SiN_2P_2(OBu)_8(OH)_2$ | ss | s | s | s | s |
| 5 | $SiN_1P_3(OBu)_8(OH)_2$ | ss | s | s | s | s |
| 6 | $SiN_0P_4(OBu)_8(OH)_2$ | ss | s | s | s | s |
| 8 | c-$SiN_2P_2(OBu)_8(OSi(n-C_6H_{13})_3)_2$ | vs | vs | vs | vs | vs |
| 9 | $SiN_4P_0(OBu)_8(OSi(n-C_6H_{13})_3)_2$ | vs | vs | vs | vs | vs |
| 10 | $SiN_3P_1(OBu)_8(OSi(n-C_6H_{13})_3)_2$ | vs | vs | vs | vs | vs |
| 11 | t-$SiN_2P_2(OBu)_8(OSi(n-C_6H_{13})_3)_2$ | vs | vs | vs | vs | vs |
| 12 | $SiN_1P_3(OBu)_8(OSi(n-C_6H_{13})_3)_2$ | vs | vs | vs | vs | vs |
| 13 | $SiN_0P_4(OBu)_8(OSi(n-C_6H_{13})_3)_2$ | vs | vs | vs | vs | vs |
| 14 | $SiPc(dib)_4(OBu)_8(OH)_2$ | I | s | s | | |
| 16 | $H_2N_4P_0(OBu)_8$ | ss | s | s | s | s |
| 17 | $H_2N_3P_1(OBu)_8$ | ss | s | s | s | s |
| 18 | c-$H_2N_2P_2(OBu)_8$ | ss | s | s | s | s |
| 19 | t-$H_2N_2P_2(OBu)_8$ | ss | s | s | s | s |
| 20 | $H_2N_1P_3(OBu)_8$ | ss | s | s | s | s |
| 21 | $H_2N_0P_4(OBu)_8$ | ss | s | s | s | s | a ss, slightly soluble (<1 mg/mL);
s, soluble (~1–5 mg/mL);
vs, very soluble (>5 mg/mL).

The solubilities of the solid phthalocyanine complexes in organic solvents as shown in Table II indicate that for comparable pairs of complexes, the complex with the larger axial groups is more soluble.

All of the phthalocyanine complexes of the above examples display intense colors. $SiPc(OBu)_8(OSi(n—C_6H_{13})_3)_2$ has, for example, a particularly beautiful green color in solution.

Ultraviolet-Visible Light Absorption Analysis

The twenty-eight maxima of the Q-bands of eighteen of the compounds made, Table III can be grouped into three sets. The first contains 10 maxima in a 24 nm range running from 739–763 nm. The second contains 9 maxima in a 32 nm range running from 793–825 nm, and the third 9 maxima in a 14 nm range running from 851–865 nm, as shown in Table III.

TABLE III

Q-Band Maxima

| | range | | band | | | | compound | | |
|---|---|---|---|---|---|---|---|---|---|
| | limits | span | position | $\epsilon$ | type[a] | $\Delta$[b] | ring | core | ligands |
| | (nm) | (nm) | (nm) | ($M^{-1}cm^{-1}/10^5$) | | | | | |
| 1 | 739–763 | 24 | 739 | 0.95 | d | | $N_0P_4$ | H | |
| | | | 747 | 2.3 | s | 8 | $N_0P_4$ | Si | $OSiR_3$ |
| | | | 749 | | s | 2 | $N_0P_4$ | Si | OH |
| | | | 750 | 0.98 | d | 1 | $t-N_2P_2$ | H | |
| | | | 756 | 0.82 | d | 6 | $N_1P_3$ | H | |
| | | | 760 | 1.5 | d | 4 | $t-N_2P_2$ | Si | $OSiR_3$ |
| | | | 761 | 2.2 | d | 1 | $N_1P_3$ | Si | $OSiR_3$ |
| | | | | 1.1 | d | 1 | $N_0P_4$ | H | |
| | | | 762 | | d | 1 | $N_1P_3$ | Si | OH |
| | | | 763 | | d | 1 | $t-N_2P_2$ | Si | OH |
| 2 | 793–825 | 32 | 793 | | d | 30 | $N_1P_3$ | Si | OH |
| | | | 794 | 1.5 | d | 1 | $N_1P_3$ | Si | $OSiR_3$ |
| | | | 802 | 0.66 | d | 8 | $N_1P_3$ | H | |
| | | | 804 | 1.9 | s | 2 | $c-N_2P_2$ | Si | $OSiR_3$ |
| | | | 805 | | s | 1 | $c-N_2P_2$ | Si | OH |
| | | | 807 | 1.9 | s | 2 | $c-N_2P_2$ | H | |
| | | | 814 | 0.99 | d | 7 | $N_3P_1$ | H | |
| | | | 820 | 1.6 | d | 6 | $N_3P_1$ | Si | $OSiR_3$ |
| | | | 825 | | d | 5 | $N_3P_1$ | Si | OH |
| 3 | 851–865 | 14 | 851 | 1.2 | d | 26 | $t-N_2P_2$ | Si | $OSiR_3$ |
| | | | | 0.89 | d | 0 | $N_3P_1$ | H | |
| | | | 852 | 0.75 | d | 1 | $t-N_2P_2$ | H | |
| | | | 857 | 1.3 | d | 5 | $N_3P_1$ | Si | $OSiR_3$ |
| | | | 859 | | d | 2 | $t-N_2P_2$ | Si | OH |
| | | | 861 | | d | 2 | $N_3P_1$ | Si | OH |
| | | | 862 | 2.0 | s | 1 | $N_4P_0$ | H | |
| | | | 864 | 2.0 | s | 2 | $N_4P_0$ | Si | $OSiR_3$ |
| | | | 865 | | s | 1 | $N_4P_0$ | Si | OH |

[a]s, from single maximum band; d, from double maximum band.
[b]nm from preceding maximum The bands of the second set have maxima that are near or in the range which is most common for the line of the ordinary GaAlAs diode laser, 800–810 nm; such lasers are used for photodynamic therapy. Of the bands within this set, the 804, 805 and 807 nm bands are of particular interest because they are sharp, very intense and have maxima in the part of the diode laser band range which is most common. Since the 804, 805 and 807 nm bands belong to $c-H_2N_2P_2(OBu)_8$ $c-SiN_2P_2(OBu)_8(OH)_2$ and $c-SiN_2P_2(OBu)$ $(OSi(n-C_6H_{13})_3)_{21}$ these compounds become the ones of particular interest. These compounds have the further advantage of being stable, and highly soluble in common organic solvents, for example, toluene.

In addition, phthalocyanines and naphthalocyanines that have Q-band maxima anywhere between about 650 and 1000 nm are made by attaching suitable substituents to them and placing suitable elements in their centers. For example, large displacements of the maxima of phthalocyanines can be obtained by placing alkoxy groups on their 1,4 positions or by fusing benzo rings at their 2,3 positions. Small or tuning displacements can be obtained by placing various groups at their 2,3-positions.

Although certain embodiments of this invention have been shown and described, various adaptations and modifications can be made without departing from the scope of the invention as defined in the appended claims.

It is claimed:

1. A method for making silicon phthalocyanines and naphthalocyanines comprising the following steps:
   a. providing a metal-free phthalocyanine or naphthalocyanine;
   b. reacting the metal-free phthalocyanine or naphthalocyanine with $HSiCl_3$ to provide a first reaction product;
   c. then reacting the reaction product of step b with water to provide a second reaction product; and
   d. extracting the silicon phthalocyanine or naphthalocyanine from the second reaction product.

2. The method of claim 1, wherein the metal-free phthalocyanine or naphthalocyanine is reacted with the $HSiCl_3$ in the presence of an amine and an organic solvent.

3. The method of claim 2, wherein the solvent is $CH_2Cl_2$.

4. The method of claim 1 wherein the extraction of step d employs a volatile solvent.

5. A phthalocyanine compound having the following structure:

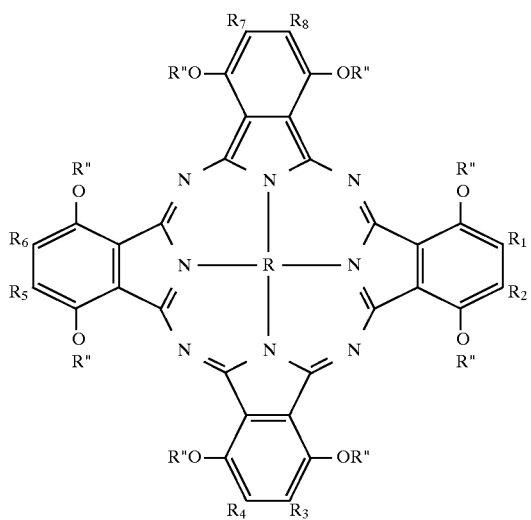

wherein:
R is Si(OSiR'$_3$)$_2$, where R' is an alkyl group having from 1–18 carbon atoms;
R$^1$ and R$^2$ are both H, or are joined to form a benzene ring;
R$^3$ and R$^4$ are both H, or are joined to form a benzene ring;
R$^5$ and R$^6$ are both H, or are joined to form a benzene ring;
R$^7$ and R$^8$ are both H, or are joined to form a benzene ring; and
R" is an alkyl group having from 1 to 18 carbon atoms.

6. The phthalocyanine compound of claim 5, wherein R is Si(OSi(n-C$_6$H$_{13}$)$_3$)$_2$ and where R1, R2, R3, R4, R5, R6, R7 and R8 are all H.

7. The phthalocyanine compound of claim 5, wherein R is Si(OSi(n-C$_6$H$_{13}$)$_3$)$_2$ and where R1 and R2 are joined to form a benzene ring, and R3, R4, R5, R6, R7 and R8 are all H.

8. The phthalocyanine compound of claim 5, wherein R is Si(OSi(n-C$_6$H$_{13}$)$_3$)$_2$ and where R1 and R2 are joined to form a benzene ring; R3 and R4 are joined to form a benzene ring, and R5, R6, R7 and R8 are all H.

9. The phthalocyanine compound of claim 5, wherein R is Si(OSi(n-C$_6$H$_{13}$)$_3$)$_2$, and where R1 and R2 are joined to form a benzene ring; R5 and R6 are joined to form a benzene ring, and R3, R4, R7 and R8 are all H.

10. The phthalocyanine compound of claim 5, wherein R is Si (OSi (n—C$_6$H$_{13}$)$_3$)$_2$, and where R1 and R2 are joined to form a benzene ring; R3 and R4 are joined to form a benzene ring; R5 and R6 are joined to form a benzene ring; and R7 and R8 are both H.

11. The phthalocyanine compound of claim 5, wherein R is Si(OSi(n—C$_6$H$_{13}$)$_3$)$_2$, and where R1 and R2 are joined to form a benzene ring; R3 and R4 are joined to form a benzene ring; R5 and R6 are joined to form a benzene ring; and R7 and R8 are joined to form a benzene ring.

12. The phthalocyanine compound of claim 5, wherein R is Si(OH)$_2$, and where R1, R2, R3, R4, R5, R6, R7 and R8 are all H.

13. The phthalocyanine compound of claim 5, wherein R is Si(OH)$_2$, and where R1 and R2 are joined to form a benzene ring, and R3, R4, R5, R6, R7 and R8 are all H.

14. The phthalocyanine compound of claim 5, wherein R is Si(OH)$_2$ and where R1 and R2 are joined to form a benzene ring; R3 and R4 are joined to form a benzene ring, and R5, R6, R7 and R8 are all H.

15. The phthalocyanine compound of claim 5, wherein R is Si(OH)$_2$ and where R1 and R2 are joined to form a benzene ring; R5 and R6 are joined to form a benzene ring, and R3, R4, R7 and R8 are all H.

16. The phthalocyanine compound of claim 5, wherein R is Si(OH)$_2$, and where R1 and R2 are joined to form a benzene ring; R3 and R4 are joined to form a benzene ring; R5 and R6 are joined to form a benzene ring; and R7 and R8 are both H.

17. The phthalocyanine compound of claim 5, wherein R is Si(OH)$_2$ and where R1 and R2 are joined to form a benzene ring; R3 and R4 are joined to form a benzene ring; R5 and R6 are joined to form a benzene ring; and R7 and R8 are joined to form a benzene ring.

18. A phthalocyanine compound having the following structure:

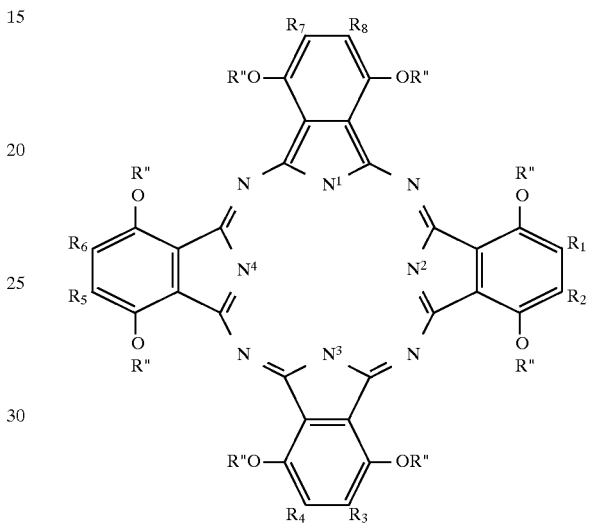

wherein: two N, selected from the group of N1, N2, N3, and N4, have a H bound to or associated therewith;

and the structure contains from one to three benzene rings selected form the following:
a benzene ring formed by the joining of R$^1$ and R$^2$;
a benzene ring formed by the joining of R$^3$ and R$^4$;
a benzene ring formed by the joining of R$^5$ and R$^6$;
a benzene ring formed by the joining of R$^7$ and R$^8$.

19. The phthalocyanine compound of claim 18, wherein R1 and R2 are joined to form a benzene ring, and R3, R4, R5, R6, R7 and R8 are all H.

20. The phthalocyanine compound of claim 18, wherein R1 and R2 are joined to form a benzene ring; R3 and R4 are joined to form a benzene ring, and R5, R6, R7 and R8 are all H.

21. The phthalocyanine compound of claim 18, wherein R1 and R2 are joined to form a benzene ring; R5 and R6 are joined to form a benzene ring, and R3, R4, R7 and R8 are all H.

22. The phthalocyanine compound of claim 18, wherein R1 and R2 are joined to form a benzene ring; R3 and R4 are joined to form a benzene ring; R5 and R6 are joined to form a benzene ring; and R7 and R8 are both H.

23. A phthalocyanine compound having the following structure:

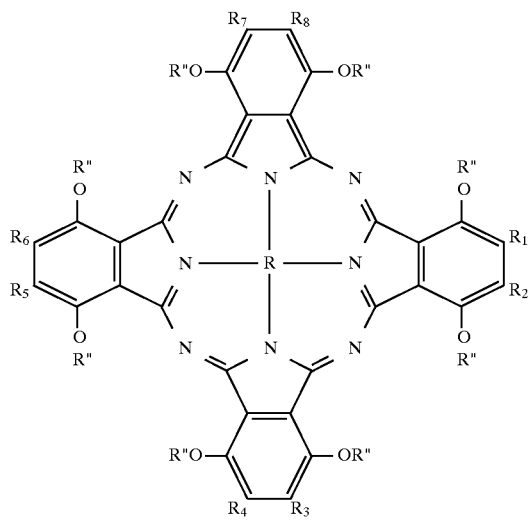

wherein:
R is Si(OH)$_2$;

R$^1$ and R$^2$ are both H, or are joined to form a benzene ring;
R$^3$ and R$^4$ are both H, or are joined to form a benzene ring;
R$^5$ and R$^6$ are both H, or are joined to form a benzene ring;
R$^7$ and R$^8$ are both H, or are joined to form a benzene ring; and
R" is an alkyl group having from 1 to 18 carbon atoms.

24. The phthalocyanine compound of claim 22, wherein R1 and R2 are joined to form a benzene ring, and R3, R4, R5, R6, R7 and R8 are all H.

25. The phthalocyanine compound of claim 22, wherein R1 and R2 are joined to form a benzene ring; R3 and R4 are joined to form a benzene ring, and R5, R6, R7 and R8 are all H.

26. The phthalocyanine compound of claim 22, wherein R1 and R2 are joined to form a benzene ring; R5 and R6 are joined to form a benzene ring, and R3, R4, R7 and R8 are all H.

27. The phthalocyanine compound of claim 22, wherein R1 and R2 are joined to form a benzene ring; R3 and R4 are joined to form a benzene ring; R5 and R6 are joined to form a benzene ring; and R7 and R8 are both H.

* * * * *